US006899356B2

(12) United States Patent
Slack et al.

(10) Patent No.: US 6,899,356 B2
(45) Date of Patent: May 31, 2005

(54) TUBULAR CONNECTION FLOATING SHOULDER RING

(75) Inventors: Maurice William Slack, Edmonton (CA); Trent Michael Victor Kaiser, Calgary (CA)

(73) Assignee: Tesco Corporation, Calgary (CA)

( * ) Notice: Subject to any disclaimer, the term of this patent is extended or adjusted under 35 U.S.C. 154(b) by 0 days.

(21) Appl. No.: 10/297,630

(22) PCT Filed: Jun. 11, 2001

(86) PCT No.: PCT/CA01/00859

§ 371 (c)(1),
(2), (4) Date: Aug. 25, 2003

(87) PCT Pub. No.: WO01/94830

PCT Pub. Date: Dec. 13, 2001

(65) Prior Publication Data

US 2004/0046388 A1 Mar. 11, 2004

(30) Foreign Application Priority Data

Jun. 9, 2000 (CA) .............................................. 2311156

(51) Int. Cl.⁷ ................................................ F16L 15/04
(52) U.S. Cl. .................. 285/333; 285/148.27; 285/390; 411/352; 411/516
(58) Field of Search ................................ 285/344, 333, 285/334, 390, 355, 148.27; 464/89; 411/352, 353, 516, 517, 521; 277/604, 605, 607, 609

(56) References Cited

U.S. PATENT DOCUMENTS

| 1,906,057 | A | * | 4/1933 | Guy ............................. 464/89 |
| 1,941,061 | A | * | 12/1933 | Thiry ........................... 464/89 |
| 2,199,926 | A | * | 5/1940 | Swennes ....................... 464/75 |
| 3,172,934 | A | * | 3/1965 | Krieg ........................... 264/263 |
| 3,321,935 | A | * | 5/1967 | Wildbaber ..................... 464/75 |
| 3,472,533 | A | * | 10/1969 | Turner .......................... 285/55 |
| 4,426,095 | A | * | 1/1984 | Buttner ........................ 277/606 |
| 4,537,406 | A | * | 8/1985 | Hirasuna et al. ............ 277/314 |
| 4,568,113 | A | * | 2/1986 | Axford et al. .............. 285/334 |
| 5,129,689 | A | * | 7/1992 | Newski et al. .............. 285/333 |
| 5,689,871 | A | * | 11/1997 | Carstensen ................. 29/401.1 |
| 6,176,524 | B1 | * | 1/2001 | Tsuru et al. .................. 285/55 |

FOREIGN PATENT DOCUMENTS

GB 1 235 791 6/1971

\* cited by examiner

*Primary Examiner*—Eric K. Nicholson
(74) *Attorney, Agent, or Firm*—Bennett Jones LLP

(57) ABSTRACT

A shoulder ring (10) for installing in the J-space between the installed pin ends within a coupling collar is taught having a body with a central opening therethrough, a first end face (12) on the body, an opposite end face (14) on the body, an inner surface (16) adjacent the central opening and extending between the first end face and the opposite end face and an outer surface (18) extending between the first end face and the opposite end face, the body having a substantially uniform cross sectional shape between the first end face, the opposite end face, the inner surface and the outer surface and the ring shaped such that its radius to the outer surface varies around the outer surface circumference to form a plurality of lobes (12).

25 Claims, 5 Drawing Sheets

TUBULAR CONNECTION FLOATING SHOULDER RING

FIELD OF THE INVENTION

The present invention relates to tube couplings and in particular, a floating shoulder ring for tube couplings.

BACKGROUND OF THE INVENTION

Tubulars used to drill and complete bore holes in earth materials are typically joined by threaded connections. Numerous threaded connection geometries are employed to provide sealing and load carrying capacities to meet drilling, installation and operating requirements. Of these geometries, tapered pipe threads are among the simplest and most widely used.

Within the context of petroleum drilling and well completion, wells are typically constructed by drilling the well bore using one tubular string, largely comprised of drill pipe, then removing the drill pipe string and completing by installing a second tubular string, referred to as casing, which is subsequently permanently cemented in place. The tubular strings are formed by connecting lengths of pipe, referred to as joints, with threaded connections. With this historic method of well construction, both the drill pipe and casing joint designs are separately optimised for the different performance requirements of the drilling and completion operations respectively. More specifically, the drill pipe connections must accommodate torque required to drill, which is not required during completion.

Recent advances in drilling technology have enabled wells to be drilled and completed with a single casing string, eliminating the need to 'trip' the drill pipe in and out of the hole to service the bit and make room for the casing upon completion of drilling. This change is motivated by potential cost savings arising from reduced drilling time and the expense of providing and maintaining the drill string, plus various technical advantages, such as reduced risk of well caving before installation of the casing.

However, using casing to both drill and complete the well changes the performance requirements of the casing string, and more particularly the torque capacity of the casing connections, from those established through use within the historic methods of well construction.

The most widely used of casing connections, are the industry standard threaded and coupled buttress (BTC) and 8-round (LTC or STC) connections having tapered pipe thread geometries specified by the American Petroleum Institute (API). These connections have limited torque capacity and are thus not well suited to the casing drilling application, but are readily available and relatively inexpensive. To more fully realize the potential benefit of this emerging casing drilling system (CDS) technology, it is therefore desirable to find means to press these industry standard connections into service by identifying means to inexpensively increase their torque capacity.

Similar motivations to improve the sealing capacity of connections using API thread forms, have led to the invention of apparatus and methods such as described in U.S. patents, U.S. Pat. No. 4,706,997, U.S. Pat. No. 4,878,285, U.S. Pat. No. 5,283,748, U.S. Pat. No. 5,689,871 and U.S. Pat. No. 4,679,831. These patents generally describe inventions where a modified coupling, provided with an internal floating sleeve or seal ring, is employed to join pipes having standard API thread forms on their pin ends. The seal ring is positioned in the so-called J-section space between the pin ends of a made-up threaded and coupled connection. The seal ring internal diameter is approximately matched to the internal pipe diameter and is coaxially placed inside the coupling at its mid plane so as to engage both the pin ends when the connection is made up. According to the teachings of these inventions, this engagement or shouldering is primarily intended to enhance the seal performance of the connection beyond that provided by the standard API configuration. Several additional benefits are also obtained such as improved flow performance and a smooth running bore. The use of resilient materials in conjunction with the rigid seal ring or as separate seals are also taught as means to further promote sealing.

While these descriptions of the prior art do not explicitly address the utility of such a "convertible metal ring" or seal ring as a means to improve the torque capacity, otherwise available from API connections, the increased torque capacity is a well know benefit. In fact, manufacturers of such connections quantify this parameter in published performance data such as provided by Hunting Oilfield Services for a product described as "the KC Convertible coupling system".

These prior art implementations of rigid seal rings recognise that the wide tolerance variation allowed for the pin and box geometries of threaded and coupled connections meeting API specifications permits a correspondingly wide range of axial position after make up, if a satisfactory level of interference or "dimensional control" is to be achieved (see U.S. Pat. No. 5,283,748). Consequently, to obtain satisfactory "dimensional control" this prior art teaches that additional measures must be taken to reduce the tolerance range of pins and/or boxes provided for use with seal rings and to control the make up position. Such steps include specifically manufacturing "modified boxes" to tighter tolerances than required by API specifications and prescreening of product manufactured to API tolerances to similarly obtain pins and boxes having more precisely controlled geometry. To ensure controlled placement and retention of the seal ring, it is taught that additional machining of the coupling central thread region is required to form a seat for the seal ring. To obtain dimensional control of the so-called mill end make up position, additional fixtures or measurements are required.

However, these prior art couplings require modification of the standard API components or increased quality control and, therefore, substantially reduce the benefits of low cost and simplicity originally sought from using existing industry standard couplings and pins. In addition, prior art couplings are in large part motivated by the desire to upgrade the pressure containment capacity of API connections and, as such, are not optimised to obtain upgraded torque capacity desired for casing drilling applications.

SUMMARY OF THE INVENTION

A floating shoulder ring has been invented for tubular connections. The present invention provides a means to substantially increase the ability of tubular connections to transmit torque. When placed internally between the pipe ends of a threaded and coupled pipe connection, the torque ring acts as a floating internal upset coupling shoulder capable of reacting compressive axial load between the pin ends and thus enhancing the connection torque capacity. The present invention is particularly useful as a means to upgrade the torque capacity of tapered couplings such as, for example, unmodified API buttress and round threaded and coupled connections, manufactured to industry standard tolerances, to meet the requirements of casing drilling applications. The ring is placed substantially coaxially in the coupling of the connection, between the pin ends of the joined tubulars.

To be most generally useful for these applications, the floating shoulder ring should be amenable to rapid field installation on joints with couplings already bucked on, for example in accordance with existing procedures as generally specified by API, without damaging the connection threads. It should be anchored or securely enough fixed to prevent being dislodged or knocked out from loads arising due to handling and installation operations such as, make up, break out or equipment movement in and out of the open ended casing in the rig floor. In addition, the ring, once installed should not substantially reduce the minimum diameter (drift diameter) through the connection while being able to carry generally the maximum axial and torsional loads that can be carried by the pin tips to mobilize the full shouldering potential of the pin ends.

Thus, in accordance with a broad aspect of the present invention, there is provided a shoulder ring comprising: a body having a central opening therethrough, a first end face on the body, an opposite end face on the body, an inner surface adjacent the central opening and extending between the first end face and the opposite end face and an outer surface extending between the first end face and the opposite end face, the body having a substantially uniform cross sectional shape between the first end face, the opposite end face, the inner surface and the outer surface and the ring shaped such that its radius to the outer surface varies around the outer surface circumference to form a plurality of lobes.

The plurality of lobes define alternating radially extending peaks and valleys around the inner surface and the outer surface circumferences. The radial peaks and valleys contained within two circles having diameters referred to as the outer peak diameter and inner valley diameter. The outer peak diameter is preferably greater than the diameter of the coupling into which the ring is to be installed, so that when placed in a coupling, the peaks engage against the internal surface of the coupling with sufficient radial force to securely retain the ring in place and coincidentally to largely elastically deform the ring to displace the valleys radially outward and the peaks radially inward to force the ring into a generally circular configuration within the coupling. Preferably, the circumference of the outer surface is selected to be substantially the same as the inner circumference of the coupling into which the shoulder ring is intended to be installed.

The ring fits into the J-space between the pin ends in the coupling such that the inner surface of the ring is open to the coupled tubing string bore. In one embodiment, the inner surface circumference is less than the internal circumference of the pins and greater than the specified or otherwise required drift for the tubing string in which the ring is to be used.

The first and opposite end faces form torque shoulders against which the pin ends of pipe lengths may bear upon application of sufficient torque across the connection when the pipe lengths are made up into the boxes of a coupling. When the pin ends of the pipe lengths in the coupling are torqued against the ring end faces, the forces cause a frictional response on the ring faces and in the threads so as to react additional torque and prevent excess penetration of either of the pins into the coupling. In one embodiment, the end faces are substantially planar and/or smooth to facilitate use as torque shoulders.

Preferably, the ring has a length between the first end face and the opposite end face sufficient to permit each of the pins to bear against the ring, when they are threaded into the coupling. Preferably, the length is selected to prevent excess penetration of the pins into their respective boxes of the coupling and to maintain the made up pin position within the allowable power tight position range such as that specified by API.

To facilitate engagement of the ring within the coupling in which it is installed, in one embodiment, the ring has a roughened outer surface finish. In one embodiment, the outer surface has circumferentially extending grooves.

In accordance with another aspect of the present invention, there is provided a tubing connection comprising: a coupling including a first box end and an opposite box end, a pin end of a first tubular member engaged in the first box end of the coupling, a pin end of a second tubular member engaged in the opposite box end of the coupling and a shoulder ring installed between the pin ends, the shoulder ring including a body having a central opening therethrough, a first end face on the body, an opposite end face on the body, an inner surface adjacent the central opening and extending between the first end face and the opposite end face and an outer surface extending between the first end face and the opposite end face, the body having about its circumference a substantially uniform cross sectional shape between the first end face, the opposite end face, the inner surface and the outer surface and the ring shaped such that its radius to the outer surface varies around the outer surface circumference to form a plurality of lobes.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings.

DESCRIPTION OF THE PREFERRED EMBODIMENT

Figure 1:
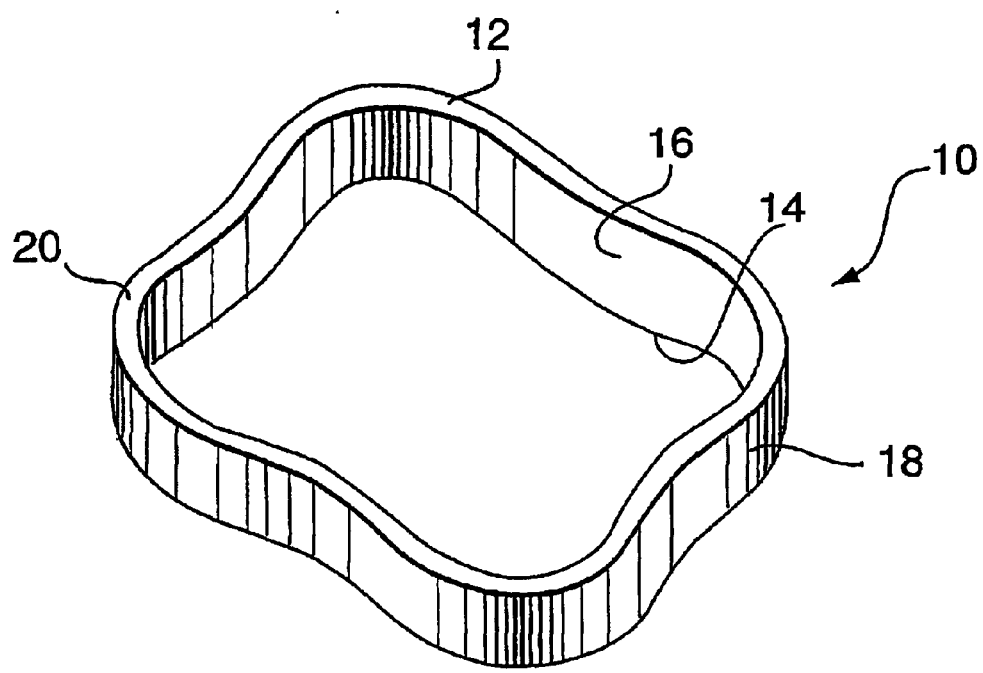
FIG. 1 is a perspective view of a shoulder ring according to the present invention.
Figure 2:
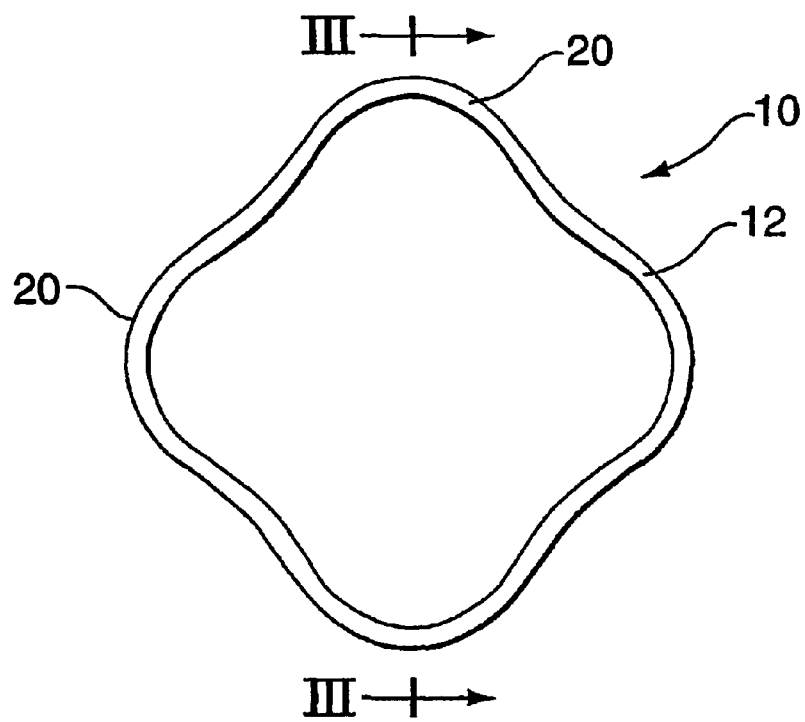
FIG. 2 is a top plan view of the ring of FIG. 1.
Figure 3:
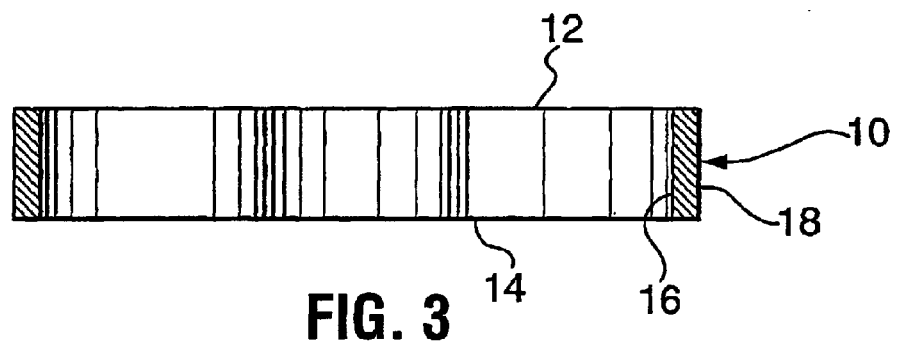
FIG. 3 is a sectional view along line III—III of FIG. 2.

According to the present invention, a shoulder ring is provided for placement in a threaded and coupled connection, such as a standard API connection, joining two lengths or joints of tubulars. As shown in FIGS. 1 to 3 a shoulder ring 10 according to the present invention has a first end face 12, an opposite end face 14, an inner surface 16 adjacent a central opening and extending between the first end face and the opposite end face and an outer surface 18 extending between the first end face and the opposite end face. The ring has a substantially uniform cross sectional shape about its circumference. In particular, the thickness of the ring between the inner surface and the outer surface does not vary substantially about the ring, nor does the length of the ring between the first end face and the opposite end face. The ring's radius to the outer surface varies around its circumference to form four lobes 20. While four lobes are shown, it is to be understood that ring can have two or more lobes, as desired. In a preferred embodiment, the multi-lobe ring of the present invention is formed to have three or more lobes, depending on the effective hoop stiffness required by the application and the diameter of the coupling in which the ring is to be used. Preferably, the lobes are substantially equally spaced apart on the ring.

The lobes are defined by radially extending peaks with valleys disposed therebetween such that the radius varies about the ring. Since the cross sectional shape of the ring about its circumference is substantially uniform, the inner radius (i.e. the radius to the inner surface) and the radius to the outer surface vary together to form the lobes.

The lobes on the ring can be formed using numerous manufacturing methods. It was found that appropriate rings could be formed using cold forming with external radial displacement, sufficient to permanently deform rings which were initially formed circular. Fixturing was used to simultaneously apply external radial displacement occurring at each valley to be equal with respect to the ring center.

Figure 4:
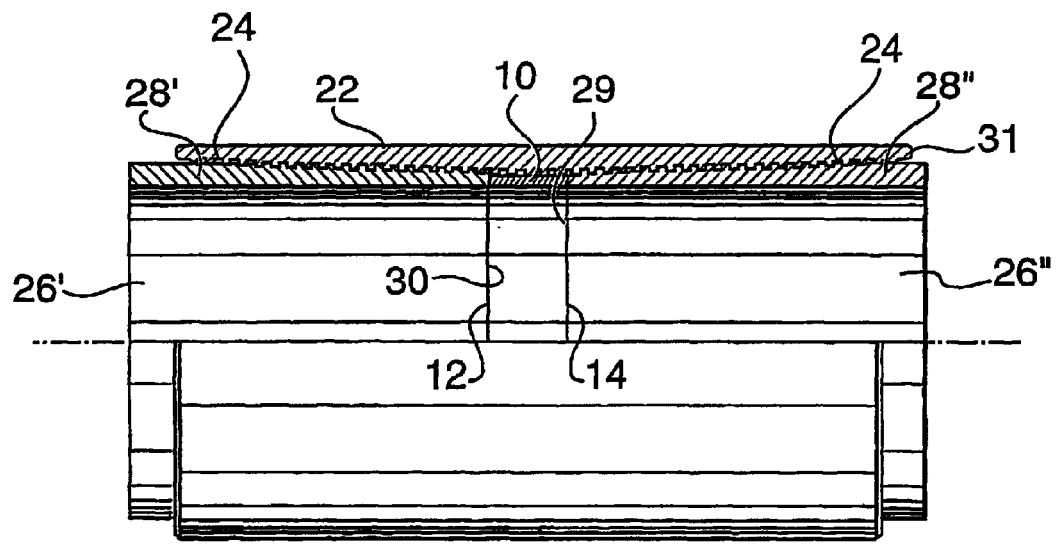
FIG. 4 is a partial sectional view through a tubular connection according to the present invention having installed therein a shoulder ring.

Referring to FIG. 4, in use, a ring 10 according to the present invention is positioned in the centre of a coupling 22 (also termed a collar), such as an API buttress coupling as shown, having internal tapered threads 24 on both ends. These female tapered threads are each referred to as a box. In the formation of a tubing string, two joints of tubing 26', 26" are threaded into the coupling. In particular, a pin end 28', 28" from each joint of tubing 26', 26" is threaded into each of the coupling boxes 24. The pin end is the common term for the externally, end-threaded male portion of the tube.

As typically employed by industry, one of the coupling boxes is arbitrarily selected for first make up, termed the mill end make up. In the first make up, one pin end 28' of a tubular joint, which male end thread is then referred to as the mill end pin is threaded into the selected box of a coupling. The box joined to the mill end pin is referred to as the mill end box and the connection itself referred to as the mill end connection. As the name suggests, the mill end make up is commonly completed at the pipe mill, and the tubulars thus prepared are shipped for eventual field assembly into a string for the well. The second make up required for field assembly, the so called field make up, joins the open male threaded end 28", termed the field end pin, of each tubular to the open box on a coupling, referred to as the field end box. This connection is termed the field end connection.

When placed in the centre of a made up coupling, end faces 12, 14 of the ring act as shoulders or abutment surfaces, against which the end face 30 of the mill end pin 28' and end face 29 of field end pin 28" can bear upon application of sufficient torque applied to complete the field end make up or subsequently during operations employing the string in the well bore to further drill or complete the well or perform other operations. The multi-lobe ring thus transmits load between the pin ends. The bearing load thus created on the pin ends, and reacted in the threads, results in an increased frictional capacity capable of resisting rotation and is largely responsible for increasing the torque capacity in the well known manner of so-called shouldering connections. This interaction between torque and axial load is commonly employed in bolted connections where applied torque is used to pre-load the bolt and exert an axial clamping force. Simultaneously, if the bearing load is sufficient to cause the pin end faces to come into conformable contact with end faces 12, 14 of the shoulder ring, shoulder seals are formed. Preferably, end faces 12, 14 are maintained smooth to enhance sealing capabilities between the ring and the pin ends.

The shoulder ring may be installed in the coupling anytime prior to stabbing the field end on the rig floor, including immediately prior to the mill end make up. However, according to a preferred embodiment of the present invention, ring 10 is installed in the coupling after the mill end connection is formed and prior to assembly on the rig floor. This is least intrusive to the existing operational practice, and allows the ring length (i.e. the distance between end faces) to be selected to accommodate variations in the mill end make up position from the specified API power tight position. In certain applications, it is desirable to select the length of the ring to control the shoulder position for the field end make up. The shoulder position is determined by the mill end make up position and the ring length. In tapered connections, radial interference imposed between the pin and box is an increasing function of make up position beyond hand tight, which in turn establishes the interfacial contact stress in the threads required to effect a thread seal and, particularly in 8-round connections, control joint strength. While sealing capacity and strength are increasing functions of contact stress, so is probability of galling and thread damage which both act against connection sealing, load capacities and reusable life. Depending on the application, improved accuracy in control of interference may therefore be used as a means to better optimize seal and load capacity against risk of thread damage and galling. Controlling field end shoulder position can thus be used to provide a more satisfactory interference state and may be accomplished as discussed hereinafter.

Variation in power tight position of the pin within the coupling, is referred to as power tight stand off, and is the axial distance from the made up end of mill end pin 28' to its power tight plane in the coupling as specified by API. The mill end power tight stand off may be determined in various ways, but is preferably obtained by measuring, as by use of a caliper, the distance from the end face 30 of the mill end pin to the face 31 of the coupling field end box and subtracting one half the coupling length and the specified distance between the centre of the coupling and the nominal end of pipe power tight planes. (See API Standard 5B, "Specification for Threading, Gauging and Thread Inspection of Casing, Tubing and Line Pipe Threads".) The mill end power tight stand off, thus determined, may be used to select the length of the ring prior to installation so that the stand off can be compensated for and the face of the installed ring face 12 can be at or near the power tight plane of the field end box. The appropriate ring length should be selected for each connection. This adjustment is most easily accomplished by providing a selection of manufactured ring lengths from which to choose during installation. In casing drilling applications, satisfactory control of the field end position covering the entire allowable range of API tolerances is obtained by providing rings in three length increments.

Figure 5:
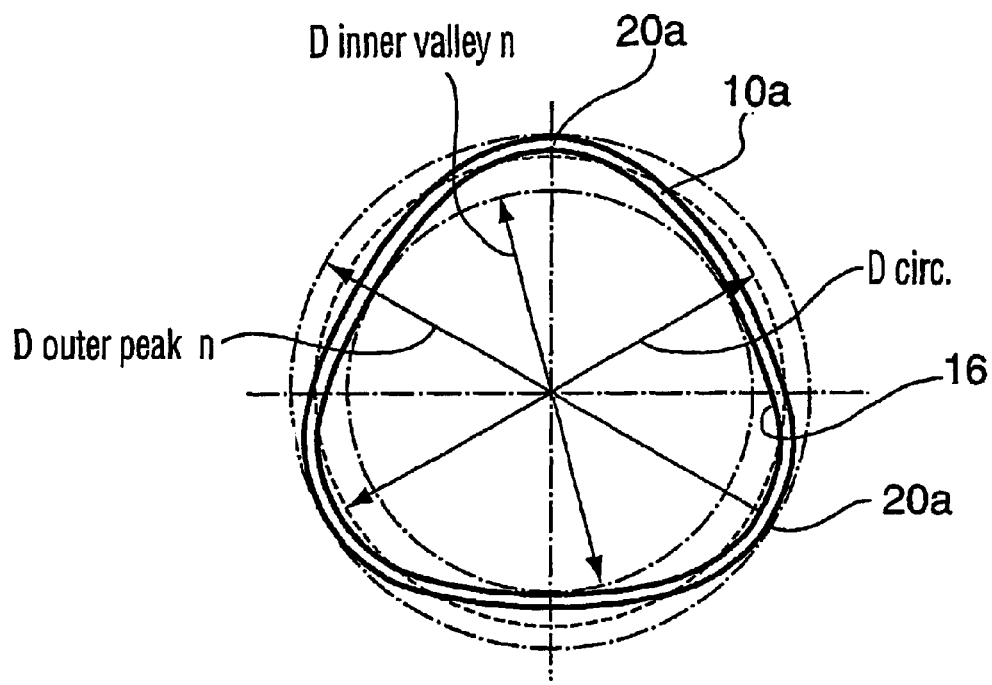
FIG. 5 is a top plan view of another shoulder ring according to the present invention, having three lobes (amplitudes shown exaggerated) and shown prior to installation.
Figure 6:
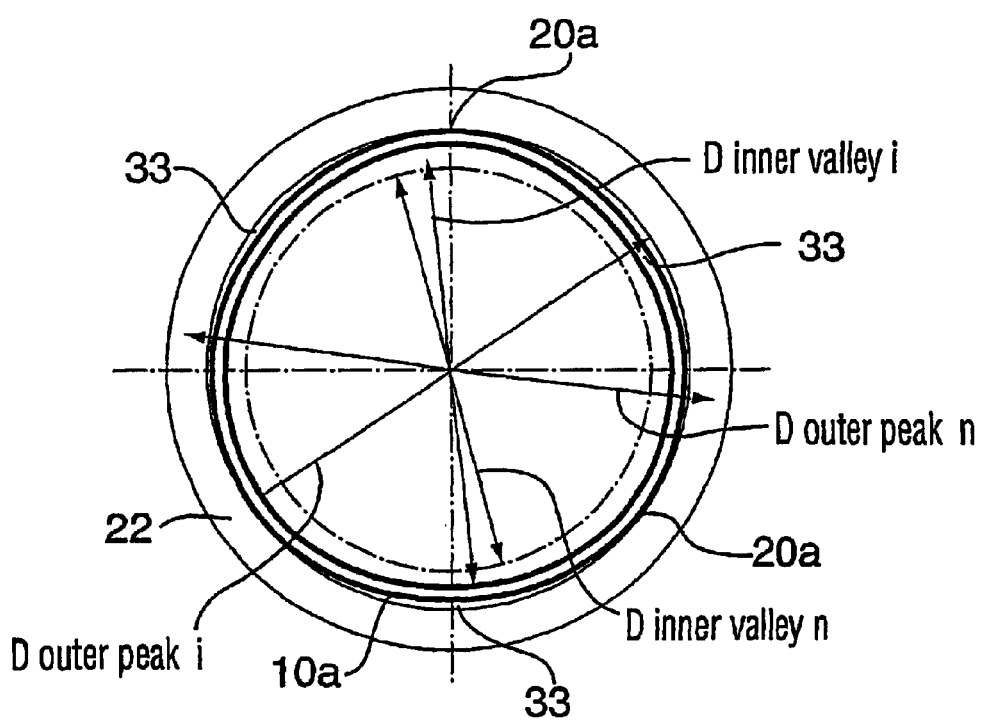
FIG. 6 is a sectional view through a coupling having installed therein a shoulder ring as in FIG. 5.

An end view of a ring 10a according to the invention is shown in FIGS. 5 and 6. Ring 10a includes three lobes 20a. FIG. 5 shows the ring in a neutral configuration, prior to installation in a coupling and with no forces applied thereto. In the neutral configuration, the ring has an effective inner diameter, termed herein the inner valley diameter $D_{inner\ valley\ n}$, which is the diameter of a circle contacting the inner most point of each of the valleys of the ring inner surface 16. The neutral ring also has an effective outer diameter, termed herein the outer peak diameter $D_{outer\ peak\ n}$, which is the diameter of a circle circumscribing the outer most point of each of the peaks of the ring outer surface 18. The ring outer surface 18 also defines a circumference, the length of which equals a circle having the diameter $D_{circ}$. When selecting the ring for use in a particular coupling, the diameter $D_{circ}$ is selected to be substantially equal to or greater than the minimum diameter of the coupling and the $D_{outer\ peak\ n}$ of the ring in the neutral configuration is selected to be greater than the minimum diameter of the coupling in which the ring is to be installed.

Installation is accomplished by placing the ring in the open box end of a coupling and forcing the ring into the box end toward the coupling center. As the ring is forced into the coupling, the lobe peaks of the outer surface come into contact with, and develop radial bearing forces, against the box threads. As ring pressure is applied to the ring to advance it toward the center of the coupling, the outer peak diameter of the ring is reduced as confined by the decreasing diameter of the tapered box. This causes the lobes to be flattened out such that the ring assumes a more circular configuration.

Eventually, when the ring is positioned at the coupling center the ring has an installed outer peak diameter $D_{outer\ peak\ i}$ close to or the same as $D_{circ}$, as shown in FIG. 6. For illustration purposes, the initial amplitude of the lobes and the final gap 33 between the lobe outer valleys and the coupling inside surface have been exaggerated in FIGS. 5 and 6.

By comparison between FIGS. 5 and 6, it will be evident that while the circumference of the ring is largely unchanged in the installed ring, the radial forces developed by installation of the ring cause the installed outer peak diameter $D_{outer\ peak\ i}$ to be less than the neutral outer peak diameter and the installed inner valley diameter $D_{inner\ valley\ i}$ to be greater than the neutral inner valley diameter. Once installed, a gap 33 may or may not be formed between the coupling and the ring outer surface at the positions of the original valleys, depending on the actual coupling diameter, $D_{circ}$ and plastic flow allowed by the ring outer surface finish.

It is to be understood that while in the illustrated embodiment, the lobes are formed such that the valleys move radially outwardly, when the ring is confined into the coupling, the ring can be formed such that the valleys are driven radially inwardly during installation. Whether the valleys are driven inwardly or outwardly will depend on the amplitude of the lobes and on the direction along which stresses are conducted through the ring relative to the apex of the valleys.

To meet requirements for some applications such as casing drilling, preferably, the ring is selected such that the $D_{inner\ valley\ i}$ of the installed ring is less than the inner diameter of the pins and greater than the specified or otherwise required drift diameter for the tubing string in which the ring is to be used. It is preferred that the final inner diameter be less than the inner diameter of the tubing so that the pin end tends not to deform inwardly as readily when it bears against the ring at he upper limit of the system torque capacity. In addition, for applications where the pin end and therefore the ring thickness is thin relative to the pipe body thickness, forming the ring thicker than the pin end improves its strength and stability thus allowing higher loads to be carried for the same material.

The largely flexural stresses arising during installation from the reduction of the outer peak diameter and the radially outward movement of the ring valleys offers the ring of the present invention a reduced effective hoop stiffness and an increased radial elastic range when compared to a constant radius ring shape under 'shrink fit' radial loading conditions. In this context, effective hoop stiffness is defined as: change in average radial stress developed on the exterior of a multi-lobe ring caused by a change in radius of a largely cylindrical confining surface (i.e. a surface having a diameter less than the initial outer peak diameter) divided by said change in radius, i.e., average contact stress increase between a multi-lobe ring and a confining surface per unit decrease in the confining surface radius. Elastic range refers to the range of confining diameters over which the hoop stiffness of a multi-lobe ring is largely constant.

The effective hoop stiffness and elastic range can be adjusted by selecting the number of lobes, initial outer peak and inner valley diameters and ring cross sectional area. In particular, with respect to the hoop stiffness and the number of lobes on the ring, increasing the number of lobes on a ring with a given diameter requires each lobe to have a shorter wavelength and, therefore, the ring to have greater hoop stiffness. In the limit where the number of lobes approaches infinity and thus the wavelength of each lobe is close to zero, the 'lobed' ring becomes a plain circular (axi-symmetric) ring with maximum hoop stiffness. Generally, the number of lobes on the ring is selected for a given connection size and weight to optimize the gripping force over the range of tolerances allowed by API in combination with other factors such as the installation method, risk of thread damage and material selection.

While preferably, the ring is formed of a material similar to that used to form the coupling, material mechanical properties can be used to adjust the effective hoop stiffness and elastic range of the ring. In addition or alternately, the effective hoop stiffness and elastic range of the ring can be adjusted by forming the lobes of the ring to be non-symmetrical. Varying lobe shape may be used as another means to control the effective hoop stiffness and elastic range to further optimize the gripping capacity of the ring. In particular, if the lobe shapes were not all similar the lobe valleys would not tend to expand at the same rate when the peaks are forced to compress under confinement in the coupling. As an example, it may be useful to form a ring having lobes of alternating short and long wavelengths to provide higher gripping force over a greater elastic range of radial interference.

It will be appreciated by one skilled in the art that the particularly selected ring parameters are best combined and weighed using various stress analysis techniques such as the finite element method (FEM).

Figure 7:
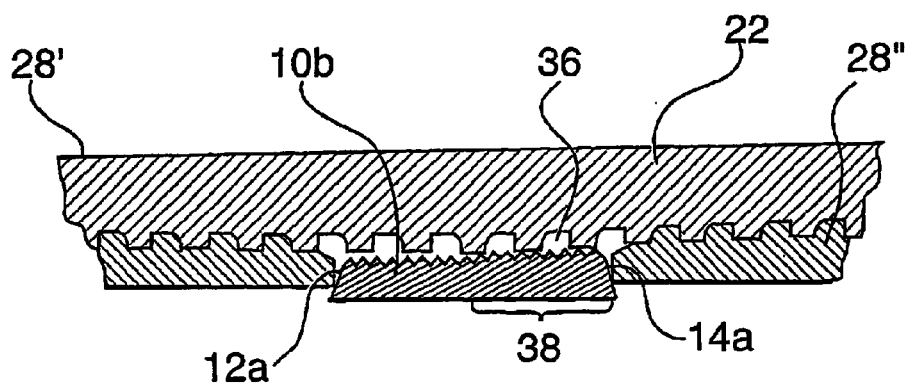
FIG. 7 is an enlarged sectional view through a tubular connection including another shoulder ring according to the present invention.

In one embodiment, the effective frictional capacity or gripping force provided by a ring 10b capable of exerting a given radial force is increased by roughening the ring's outer surface, as shown in FIG. 7. The roughening may be provided in various ways such as knurling or machining of directional teeth and may be provided in combination with hardening. Simple V-shaped grooves 36, as shown, have provided substantially increased effective friction coefficients from that obtained with smooth surfaces and are economic to manufacture such as by cutting circumferential machined grooves in the ring exterior surface. Preferably, the outer surface is roughed prior to forming the lobes.

As a further means to improve the gripping force of the ring of the present invention within a coupling, a portion 38, for example one half, of the outer surface of the ring can be shaped generally frustoconically to flare outwardly towards face 14a to follow the coupling box taper. In particular, to facilitate installation into a coupling preferably about one half of the length of the ring is made generally of uniform thickness. About half the length of the ring has an outer surface which flares outwardly toward face 14a such that the thickness of the ring is gradually increased from about the center of the ring to face 14a. This causes a portion of the ring to have a frustoconical outer surface substantially matching the taper of the coupling box. Thus, when the ring is properly installed in a tapered coupling, the field end of the ring is in contact with the threads of the coupling. The inner surface preferably remains generally linear along the entire ring. This embodiment accommodates installation of the ring into the coupling and past the coupling's minimum center diameter but provides more conformable contact between the frustoconical portion 38 and the coupling box, which will usually be the field end box.

In another aspect of the preferred embodiment, a further increase in torque capacity can be gained, particularly for API connections of thinner wall tubulars, by shaping end faces 12a, 14a of the present ring with a convex frustoconical profile. In particular, the end faces can be formed to slope back from the inner edge to the outer edge providing a reverse angled shoulder on which the pin end bears when reacting torque. This will tend to prevent the pin end from sliding inward under application of high load. Instead the pin end will be forced radially outwardly causing it to pinch between the ring and the coupling, thus further increasing the torque capacity of the connection. To function properly with this configuration, the strength of the ring as a result of thickness or material properties must be sufficient to support the stresses at the thinner inner edge.

While a ring having both a frustoconical outer surface and frustoconical end faces is shown in FIG. 7, it is to be understood that each of these modification can be used on their own a particular ring, as desired.

Figure 8:
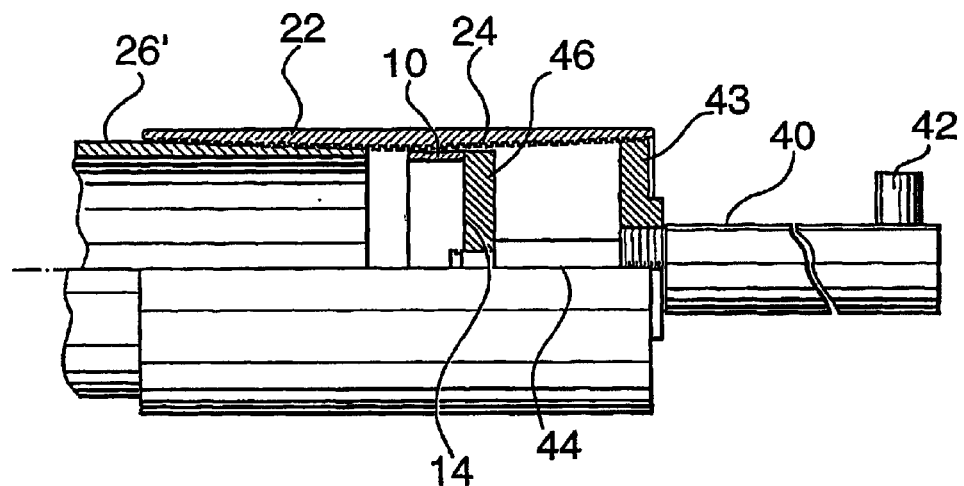
FIG. 8 is a partial section through a tubular connection during installation of a shoulder ring according to the present invention.

Various means can be employed to position the ring in the coupling centre including simply pushing the ring into an open box by hand and allowing the pin end to displace it toward centre during make up. However in one embodiment, a hydraulic installation device is provided as shown in FIG. 8, comprised of a single acting hydraulic actuator, 40, which may be pressured by suitable means through its pressure port 42. The hydraulic actuator includes a threaded plate 43 and is secured by threading into an open box end of a coupling 22. The hydraulic actuator piston 44 is coaxially positioned relative to threaded plate 43 and has attached thereto a load plate 46 configured to engage and apply a force to the end face 14 of ring 10 located in open box end 24 of coupling 22 pushing it toward the coupling centre. The frictional forces developed between the ring and the box are reacted through the coupling body to the threaded plate which completes the load reaction into the ram body.

This device can also be used to remove installed rings from couplings with both pins removed, should this be required for repair or other purposes. To remove a ring, the load plate is forced against the ring to push it out of engagement with the coupling.

The installation means provided by this device is readily deployed in settings such as pipe yards and rig sites where the tubulars are stored on pipe racks. The threaded plate 43 is readily threaded into the exposed box end on the pipe rack and centrally positions the device to ensure accurate and controlled installation. Sufficient hydraulic power may be easily obtained with electric or pneumatically powered pumps enabling rapid installation of the rings.

The range of diameters allowed at the center of couplings manufactured to API specifications is large compared to the available elastic range of constant radius steel rings, but is readily accommodated by rings of the present invention having a minimum of two but preferably three or more lobes while simultaneously controlling the average radial stress to balance installation load against gripping force. This can be accomplished while preferably ensuring the installed inner diameter does not fall below the minimum drift diameter required by the application for the rings installed in maximum internal diameter couplings and preferably without substantially engaging the inelastic hoop response of the ring.

As an example, Table 1 gives the peak and valley dimensions of a four-lobe ring developed for use in a connection conforming to the API specifications for a 178 mm (7 inch) 34.3 kg/m (23 lb/ft) Buttress Threaded and Coupled (BTC) connection where the specified casing drift diameter is 158.52 mm (6.241 inches). The range of coupling inner diameters allowed by API are the same as the installed $D_{outer\ peak}$ diameters shown in Table 1. These dimensions are inferred from the gauging specifications given by API since the diameter in this region is not explicitly controlled by the API specifications.

TABLE 1

Lobe geometry of example four-lobe ring for use in 178 mm (7 inch) 34.3 kg/m (23 lb/ft) API Buttress Threaded and Coupled connection.

| Process Stage | $D_{inner\ valley}$ (mm) | $D_{outer\ peak}$ (mm) |
| --- | --- | --- |
| Before forming (circular ring) | 161.2 | 169.6 |
| At maximum forming displacement | 155.5 | 173.5 |
| After forming | 158.0 | 171.9 |
| Installed to largest coupling inner diameter | 159.5 | 170.4 |
| Installed to smallest coupling inner diameter | 160.0 | 169.9 |

Nominal ring length: 25.4 mm (1.0 inch)
Ring material: API L80 Steel (minimum yield strength 550 MPa (80,000 psi))

Figure 9:
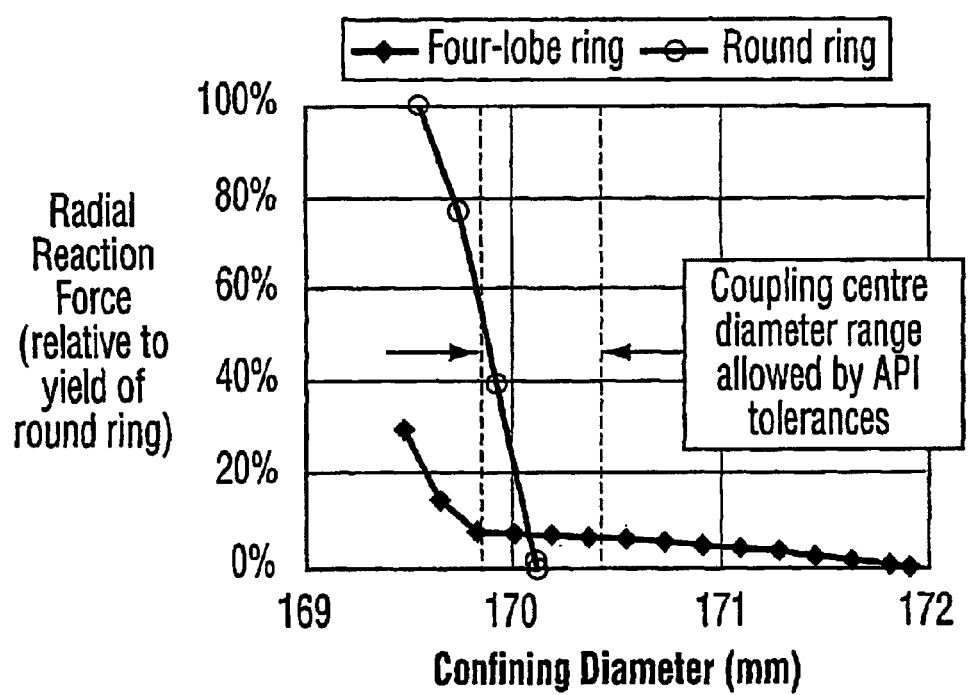
FIG. 9 is a graph comparing radial stiffness of an exemplary four-lobe ring for use in 178 mm (7 inch) 34.3 kg/m (23 lb/ft) API Buttress Threaded and Coupled connection and the response of equivalent thickness round ring.

Given this ring geometry and properties, a finite element analysis was performed to predict the radial force that will develop as the ring is pushed into the tapered coupling and the confining diameter of the ring thus decreased. FIG. 9 shows the results of this analysis for the example four-lobed ring and for a round ring having a circular circumference of equivalent thickness and material properties having an initial diameter equal to the average coupling center inside diameter. As shown, compared to the round ring, the multi-lobe ring dramatically reduces the equivalent hoop stiffness, providing a substantially constant gripping force over the range of coupling inside diameters allowed by the API Specifications for this connection type and size. As shown in Table 1, even when installed in the largest allowable coupling diameter, the minimum inside diameter (159.5 mm) of the ring still exceeds the specified drift diameter for the pipe (158.52 mm) by a significant margin. Had a slightly larger initial ring diameter been used, this minimum diameter could be lessoned at the expense of creating a greater radial or gripping force for couplings having the smallest allowable diameter with consequent higher installation force required to position the ring in the coupling center. It will be apparent to one skilled in the art that various similar adjustments can be made in the design parameters, such as the number of lobes, to manipulate the behavior of the rings to meet a variety of application requirements.

It will be apparent that many other changes may be made to the illustrative embodiments, while falling within the scope of the invention and it is intended that all such changes be covered by the claims appended hereto.

What is claimed is:

1. A subterranean well tubular connection floating shoulder ring for installation in a tubular connection of a pair of pins between the pin ends, the shoulder ring comprising: a body having a central opening therethrough, a first end face on the body, an opposite end face on the body, an inner surface adjacent the central opening and extending between the first end face and the opposite end face and an outer surface extending between the first end face and the opposite end face, the body having about its circumference a substantially uniform cross sectional shape between the first end face, the opposite end face, the inner surface and the outer surface and the ring shaped such that its radius to the outer surface varies around the outer surface circumference to form a plurality of lobes prior to installation, the plurality of lobes defining an outer lobe radius for the ring, such outer lobe radius being reduced by radial forces developed upon installation of the ring in the tubular connection.

2. The shoulder ring of claim 1 wherein the inner surface has a circumference less than the internal circumference of the pins and greater than the required drift for the pins.

3. The shoulder ring of claim 1 further comprising a roughened outer surface finish.

4. The shoulder ring of claim 3 wherein the roughened outer surface finish includes circumferentially extending grooves.

5. The shoulder ring of claim 1 wherein there are three lobes.

6. The shoulder ring of claim 1 wherein the first end face and the opposite end face are each smooth.

7. A subterranean well tubular connection comprising: a coupling including a first box end and an opposite box end, a pin end of a first tubular member engaged in the first box end of the coupling, a pin end of a second tubular member engaged in the opposite box end of the coupling and a shoulder ring installed between the pin ends, the shoulder ring including a body having a central opening therethrough, a first end face on the body, an opposite end face on the body, an inner surface adjacent the central opening and extending between the first end face and the opposite end face and an outer surface extending between the first end face and the opposite end face, the body having about its circumference a substantially uniform cross sectional shape between the first end face, the opposite end face, the inner surface and the outer surface and the ring shaped such that its radius to the outer surface varies around the outer surface circumference to form a plurality of lobes prior to installation.

8. The shoulder ring of claim 1 wherein the plurality of lobes are positionally fixed about the circumference.

9. The subterranean well tubular connection of claim 7 wherein the pin ends of the first and the second tubular members and the first and the opposite box ends of the coupling are each threaded.

10. The subterranean well tubular connection of claim 7 wherein the shoulder ring further comprises a roughened outer surface finish.

11. The subterranean well tubular connection of claim 10 wherein the roughened outer surface finish includes grooves extending substantially circumferentially.

12. The subterranean well tubular connection of claim 7 wherein the shoulder ring inner surface has a circumference less than the internal circumference of the pin ends and greater than the required drift for the first and second tubular members.

13. The subterranean well tubular connection of claim 7 wherein the shoulder ring includes three lobes.

14. The subterranean well tubular connection of claim 7 wherein the first end face and the opposite end face of the shoulder ring are each smooth.

15. The subterranean well tubular connection of claim 7 wherein the plurality of lobes of the shoulder ring are positionally fixed about its circumference.

16. The subterranean well tubular connection of claim 7 wherein the plurality of lobes of the shoulder ring define an outer lobe radius for the ring in its neutral condition, such outer lobe radius being reduced by radial forces developed upon installation of the ring in the tubular connection.

17. A subterranean well tubular connection comprising: a coupling including a first threaded box end and an opposite threaded box end, a threaded pin end of a first tubular member engaged in the first threaded box end of the coupling, a threaded pin end of a second tubular member engaged in the opposite box end of the coupling and a shoulder ring installed between the pin ends, the shoulder ring including a body having a central opening therethrough, a first end face on the body, an opposite end face on the body, an inner surface adjacent the central opening and extending between the first end face and the opposite end face and an outer surface extending between the first end face and the opposite end face, the ring shaped such that its radius to the outer surface varies around the outer surface circumference to form a plurality of lobes prior to installation.

18. The subterranean well tubular connection of claim 17 wherein the ring body about its circumference includes a substantially uniform cross sectional shape between the first end face, the opposite end face, the inner surface and the outer surface.

19. The subterranean well tubular connection of claim 17 wherein the shoulder ring further comprises a roughened outer surface finish.

20. The subterranean well tubular connection of claim 19 wherein the roughened outer surface finish includes grooves extending substantially circumferentially.

21. The subterranean well tubular connection of claim 17 wherein the shoulder ring inner surface has a circumference less than the internal circumference of the pin ends and greater than the required drift for the first and the second tubular members.

22. The subterranean well tubular connection of claim 17 wherein the shoulder ring includes three lobes.

23. The subterranean well tubular connection of claim 17 wherein the first end face and the opposite end face of the shoulder ring are each smooth.

24. The subterranean well tubular connection of claim 17 wherein the plurality of lobes of the shoulder ring are positionally fixed about its circumference.

25. The subterranean well tubular connection of claim 17 wherein the plurality of lobes of the shoulder ring define an outer lobe radius for the ring in its neutral condition, such outer lobe radius being reduced by radial forces developed upon installation of the ring in the tubular connection.

* * * * *